(12) United States Patent
Baphna et al.

(10) Patent No.: US 10,686,756 B2
(45) Date of Patent: *Jun. 16, 2020

(54) METHOD AND APPARATUS FOR MANAGING MAC ADDRESS GENERATION FOR VIRTUALIZED ENVIRONMENTS

(71) Applicant: VMware, Inc., Palo Alto, CA (US)

(72) Inventors: Mukesh Baphna, Milpitas, CA (US); Chi-Hsiang Su, Santa Clara, CA (US); Mallik Mahalingam, Cupertino, CA (US); Jia Yu, Sunnyvale, CA (US)

(73) Assignee: VMware, Inc., Palo Alto, CA (US)

(*) Notice: Subject to any disclaimer, the term of this patent is extended or adjusted under 35 U.S.C. 154(b) by 532 days.

This patent is subject to a terminal disclaimer.

(21) Appl. No.: 15/200,931

(22) Filed: Jul. 1, 2016

(65) Prior Publication Data
US 2016/0315908 A1 Oct. 27, 2016

Related U.S. Application Data (63) Continuation of application No. 13/552,451, filed on Jul. 18, 2012, now Pat. No. 9,385,989.

(51) Int. Cl.
*H04L 29/12* (2006.01)

(52) U.S. Cl.
CPC ...... *H04L 61/2061* (2013.01); *H04L 61/2038* (2013.01); *H04L 61/6022* (2013.01)

(58) Field of Classification Search
None
See application file for complete search history.

(56) References Cited

U.S. PATENT DOCUMENTS

| | | | |
|---|---|---|---|
| 6,587,455 B1 | 7/2003 | Ray et al. | |
| 7,415,535 B1 * | 8/2008 | Kuik | H04L 61/6004 370/217 |
| 7,873,711 B2 | 1/2011 | Adams et al. | |
| 8,396,946 B1 | 3/2013 | Brandwine et al. | |
| 8,560,658 B2 | 10/2013 | Bedare et al. | |
| 8,635,350 B2 | 1/2014 | Gutt et al. | |
| 2005/0163123 A1 | 7/2005 | Gangadharan | |
| 2006/0062228 A1 | 3/2006 | Ota et al. | |
| 2006/0083262 A1 | 4/2006 | Bhatia et al. | |
| 2006/0155886 A1 | 7/2006 | da Silva et al. | |
| 2006/0248231 A1 | 11/2006 | O'Rourke et al. | |
| 2007/0071010 A1 | 3/2007 | Iyer et al. | |
| 2007/0183426 A1 | 8/2007 | Daude et al. | |
| 2007/0286210 A1 | 12/2007 | Gutt et al. | |
| 2009/0303880 A1 | 12/2009 | Maltz et al. | |
| 2009/0307334 A1 | 12/2009 | Maltz et al. | |
| 2009/0327462 A1 | 12/2009 | Adams et al. | |

(Continued)

*Primary Examiner* — Philip C Lee
(74) *Attorney, Agent, or Firm* — Patterson & Sheridan LLP (57) ABSTRACT

MAC addresses are flexibly and dynamically allocated across groups of devices that need MAC addresses. MAC address pools are defined for the groups by non-overlapping ranges of MAC addresses. The range of MAC addresses defined for any pool may be shrunk to support an expansion of the range of MAC addresses of another pool. The maximum number of universally-administered MAC addresses that can be defined for any MAC address pool is greater than $2^{16}$, and the maximum number of locally-administered MAC addresses that can be defined for any MAC address pool is greater than $2^{38}$.

20 Claims, 5 Drawing Sheets

(56) References Cited

U.S. PATENT DOCUMENTS

| | | | |
|---|---|---|---|
| 2010/0162241 A1* | 6/2010 | Koma | H04L 29/12283 |
| | | | 718/1 |
| 2010/0205304 A1 | 8/2010 | Chaturvedi et al. | |
| 2011/0022695 A1 | 1/2011 | Dalal et al. | |
| 2011/0185355 A1 | 7/2011 | Chawla et al. | |
| 2011/0213886 A1 | 9/2011 | Kelkar et al. | |
| 2011/0238793 A1 | 9/2011 | Bedare et al. | |
| 2011/0246669 A1* | 10/2011 | Kanada | G06F 9/4856 |
| | | | 709/238 |
| 2012/0144033 A1 | 6/2012 | Daude et al. | |
| 2012/0151353 A1 | 6/2012 | Joanny | |

* cited by examiner

METHOD AND APPARATUS FOR MANAGING MAC ADDRESS GENERATION FOR VIRTUALIZED ENVIRONMENTS

RELATED APPLICATIONS

This application is a continuation which claims priority from U.S. patent application Ser. No. 13/552,451, filed Jul. 18, 2012, entitled "Method and Apparatus for Managing MAC Address Generation for Virtualized Environments."

BACKGROUND

Software for managing a virtualized infrastructure is responsible for monitoring physical machines and virtual machines (VMs) running in the physical machines and for performing management operations such as provisioning and configuration tasks. One example of such management software is vSphere™ available from VMware, Inc. of Palo Alto, Calif.

Figure 1:
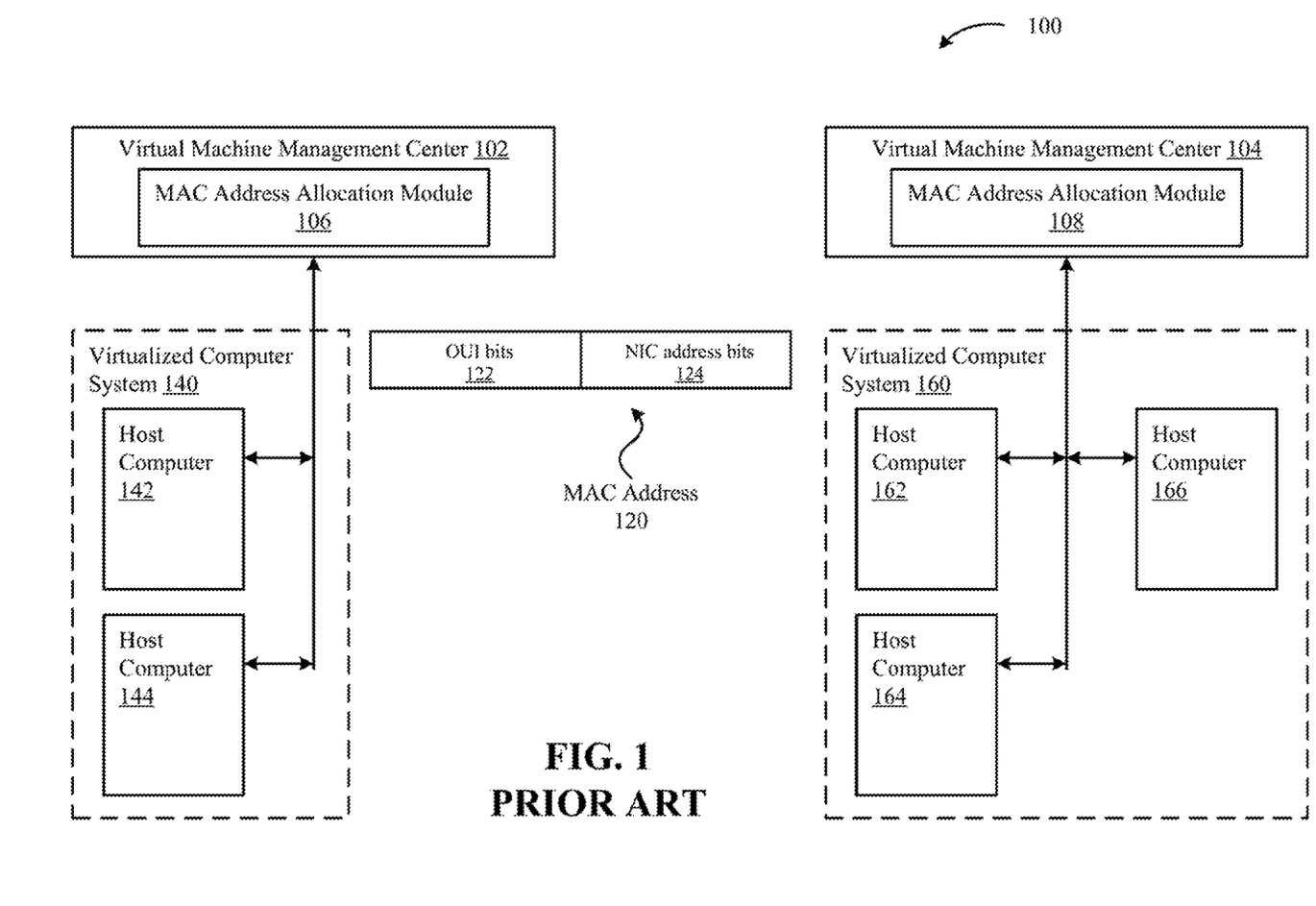
FIG. 1 is a conceptual block diagram that illustrates a virtualized infrastructure employing a conventional MAC address allocation technique.

A conventional virtualized infrastructure 100, illustrated in FIG. 1, includes VM management centers 102, 104, each of which manages a virtualized computer system that includes one or more VMs running in physical machines, such as host computers 142, 144 in virtualized computer system 140 and host computers 162, 164, 166 in virtualized computer system 160. Management tasks performed by VM management centers 102, 104 include provisioning VMs, migrating VMs between host computers, and allocating physical resources of the host computers, such as processor and memory. A MAC address allocation module within each VM management center (e.g., MAC address allocation module 106 for VM management center 102 or MAC address allocation module 108 for VM management center 104) manages MAC addresses for the VMs that are managed by the VM management center.

During provisioning of a VM, the VM management center directs its MAC address allocation module to provide a MAC address for each virtual network interface controller (vNIC) provisioned within the VM. The conventional format for a MAC address is illustrated in FIG. 1 as MAC address 120. MAC address 120 includes 6 eight-bit octets for a total of 48 bits. The first 24 bits, shown in FIG. 1 as OUI bits 122, are fixed to a set value known as the Organizationally Unique Identifier (OUI). The OUI uniquely identifies an organization, such as the software vendor that is providing or has created virtualized infrastructure 100. Two of OUI bits 122 are reserved for special purposes, one bit to specify unicast or multicast transmissions, and another bit to indicate whether the MAC addresses are administered universally or locally. The last 24 bits, shown in FIG. 1 as NIC address bits 124, identify a unique NIC address corresponding to the particular vNIC to which MAC address 120 is assigned. The NIC address is further sub-divided into a prefix and an index, typically an 8-bit prefix and a 16-bit index, where the prefix is associated with an entity administering the MAC addresses, such as the MAC address allocation module of a VM management center, and the index is assigned by that entity. Consequently, when a MAC address is generated according to the conventional format, it will contain 24 bits for the OUI, 8 bits for the prefix of the NIC address, and 16 bits for the index of the NIC address. As a result, the maximum number of unique MAC addresses that are available for allocation per MAC allocation module is $2^{16}$ and every MAC allocation module has the same number of MAC addresses available.

SUMMARY

One or more embodiments of the invention provide a technique for flexibly managing MAC addresses. This technique allows MAC addresses to be flexibly and dynamically allocated across groups of MAC allocation modules that allocate MAC addresses.

A method of managing MAC addresses, according to an embodiment of the invention, includes the steps of defining first and second MAC address pools, the first MAC address pool managed by a first virtual machine management center and defined by at least a first range of MAC addresses, and the second MAC address pool managed by a second virtual machine management center and defined by at least a second range of MAC addresses that does not overlap with the first range, and adjusting sizes of the first and second MAC address pools. The adjusting step includes programmatically contracting the first range by the first virtual machine management center and programmatically expanding the second range by the second virtual machine management center to include MAC addresses that were in the first range prior to contraction thereof.

A virtualized computer system, according to an embodiment of the invention, includes a plurality of physical host computers in which one or more virtual machines are running, a first virtual machine management center for managing a first group of virtual machines and a first MAC address pool, a second virtual machine management for managing a second group of virtual machines and a second MAC address pool, and a messaging system shared by the first and second virtual machine management centers to notify each other of use of MAC addresses that belong to a MAC address pool of the other.

Embodiments of the invention further provide a non-transitory computer-readable storage medium storing instructions that when executed by a computer system cause the computer system to perform the method set forth above.

DETAILED DESCRIPTION

Figure 2:
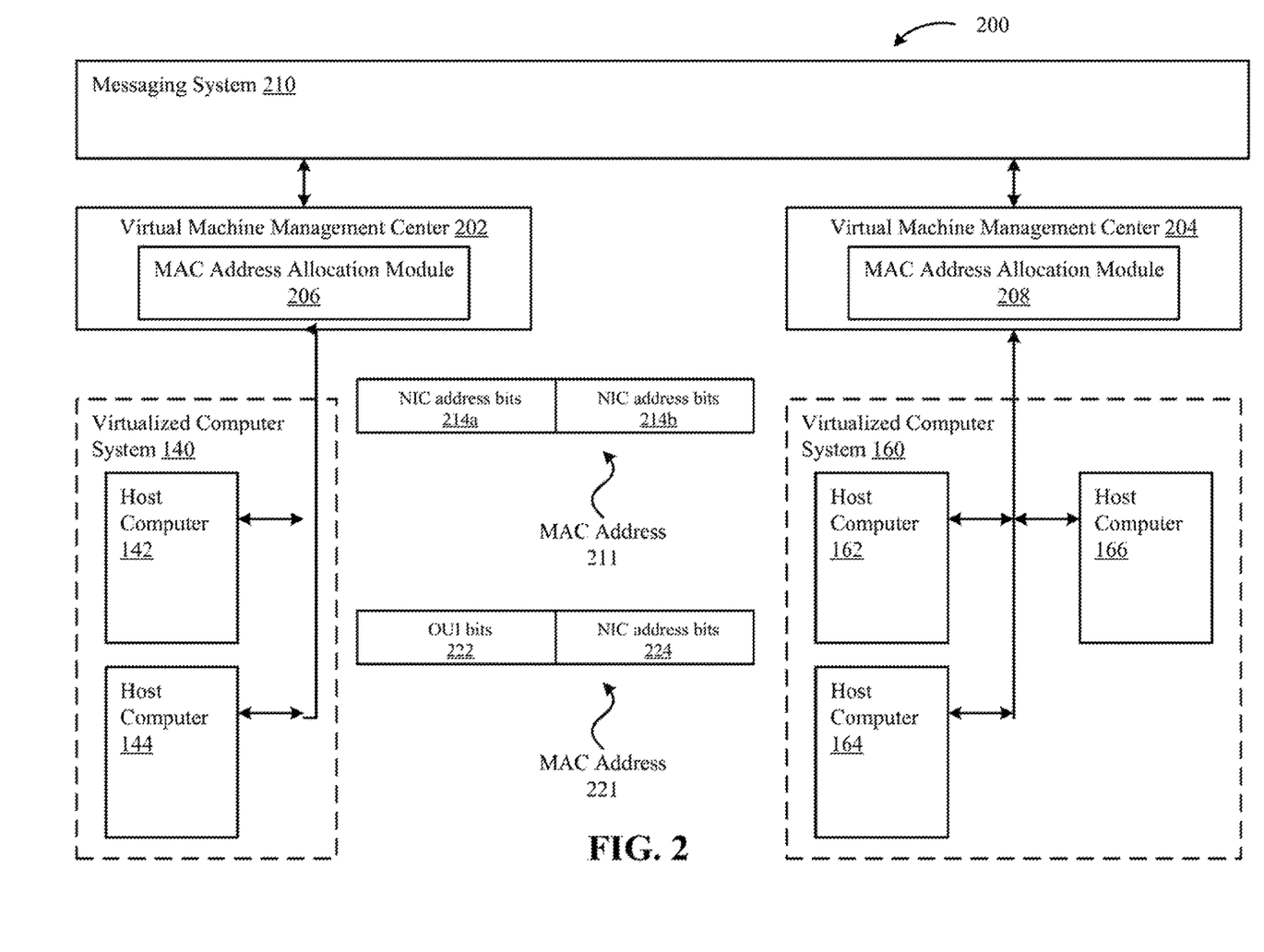
FIG. 2 is a conceptual block diagram that illustrates a virtualized infrastructure employing a MAC address allocation technique according to an embodiment of the invention.

FIG. 2 is a conceptual block diagram that illustrates a virtualized infrastructure 200 that employs a MAC address allocation technique according to one or more embodiments of the invention. In a first embodiment, VM management center (VM management center 202 or 204) directs its MAC address allocation module (MAC address allocation module 206 or 208) to provide MAC addresses having the format of MAC address 211. In this embodiment, all 48 bits of MAC address 211 (the first 24 bits are shown in FIG. 2 as NIC address bits 214a and the last 24 bits are shown in FIG. 2 as NIC address bits 214b) are reserved for the index of the NIC address. No bits are reserved for the OUI or the prefix portion of the NIC address.

In a second embodiment, the MAC address allocation modules provide MAC addresses having the format of MAC address 221. As in the conventional technique, 24 bits are reserved for OUI 122, shown in FIG. 2 as OUI bits 222, of which one bit is reserved for specifying unicast or multicast transmissions, and another bit is reserved for indicating whether the MAC addresses are administered universally or locally. The remaining 24 bits, shown in FIG. 2 as NIC address bits 224, are reserved for the index of NIC address 224. Furthermore, as in the first embodiment, no bits are reserved for the prefix of NIC address 224.

Messaging system 210 provides a communication mechanism between MAC address allocation modules of the VM management centers. In one embodiment, messaging system 210 is a software application executing on a separate server (not shown). For example, messaging system 210 may be a publication/subscription service. In such a system, VM management centers publish messages to the publication/subscription service without explicitly identifying receivers of the message, and also register to receive messages published to the publication/subscription service. It should be recognized that messaging system 210 may be implemented through various other mechanisms, including a shared memory system, a relational database management system, or an automated email system.

Figure 3:
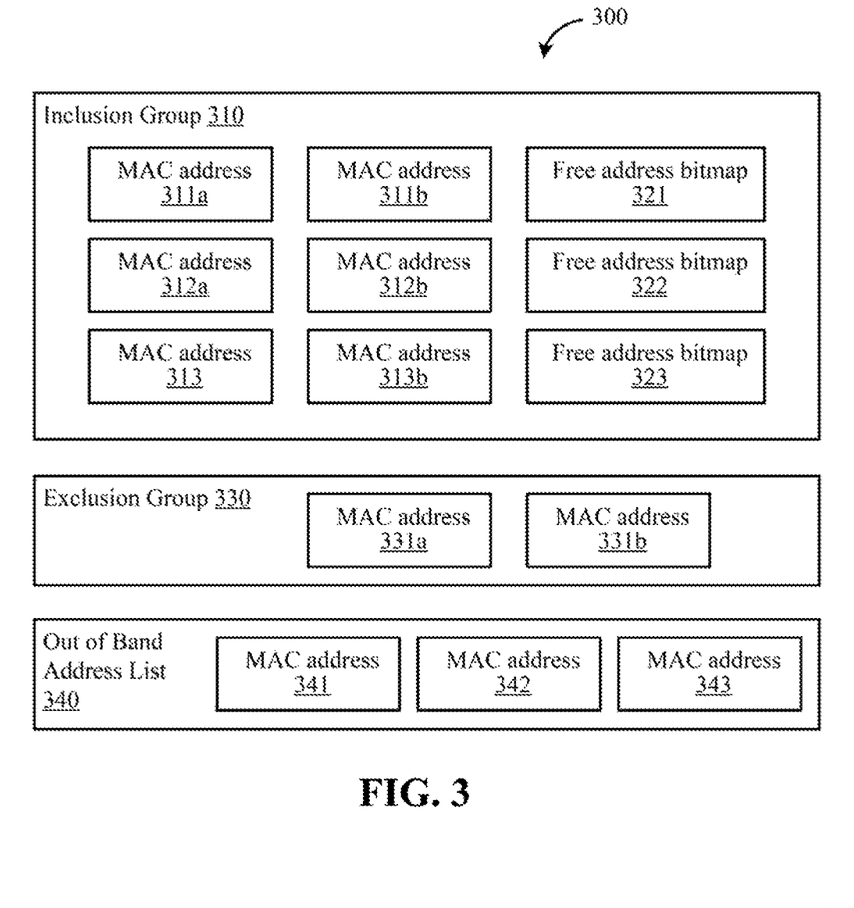
FIG. 3 is a logic diagram that illustrates MAC addresses within a MAC address pool that is managed according to an embodiment of the invention.

FIG. 3 is a conceptual illustration of a MAC address pool 300 that is managed by a MAC address allocation module (e.g., one of MAC address allocation modules 206, 208). MAC address pool 300 may be implemented in any type of data structure, and is separated into an inclusion group 310 that define all of the MAC addresses that belong to MAC address pool 300, an exclusion group 330, and an out-of-band (OOB) address list 340. Inclusion group 302 comprises one or more groups of MAC addresses that are each defined by a range. In the example shown in FIG. 3, the range of the first group extends from MAC address 311a to MAC address 311b, the range of the second group from MAC address 312a to MAC address 312b, and the range of the third group from MAC address 313a to MAC address 313b. Each range has an associated free address bitmap, namely free address bitmaps 321, 322, 323, that indicates on a per-address basis whether the addresses are used (bit=1) or free to be allocated (bit=0). It should be recognized that, in the first embodiment, the number of bits that are available for specifying the MAC address range is 48 bits and, in the second embodiment, the number of bits that are available for specifying the MAC address range is 24 bits. The ranges defined in inclusion group 310 may be increased or decreased as will be described below in conjunction with FIG. 7. The initial allocation of the ranges occurs during virtualized computer system configuration, e.g., when an instance of the virtualized computer system is created.

Exclusion group 330 may be null or include one or more groups of MAC addresses that belong to MAC address pool 300 but cannot be allocated, e.g., because they are directly managed by another application running in the same virtual machine management center as the MAC address allocation module. One example of such an application that directly manages MAC addresses is Microsoft's Network Load Balancer (NLB). In FIG. 3, one exclusion group is shown and the range of this group extends from MAC address 331a to MAC address 331b.

OOB address list 340 identifies those MAC addresses, shown in FIG. 3 as MAC addresses 341, 342, 343, that belong to MAC address pool 300 but are being used out-of-band in a different virtualized computer system. These MAC addresses typically result when a VM migrates from a host computer within one virtualized computer system to a host computer in another virtualized computer system, and the MAC addresses of the migrating VM are retained for use while the VM is running in the new host computer.

Figure 4:
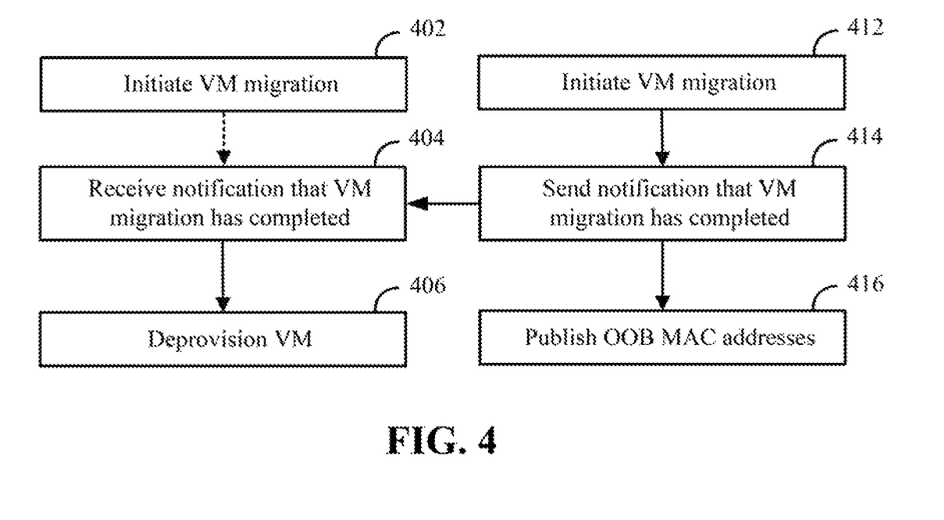
FIG. 4 is a flow diagram that highlights a few of the steps carried out in connection with VM migration.

FIG. 4 is a flow diagram that highlights few of the steps carried out in connection with VM migration from a host computer in a first virtualized computer system (e.g., host computer 142, referred to hereinafter as the "source host") to a host computer in a second virtualized computer system (e.g., host computer 162, referred to hereinafter as the "destination host"). Steps 402, 404, and 406 are carried out by a VM management center that manages the source host and steps 412, 414, and 416 are carried out by a VM management center that manages the destination host.

The VM migration is initiated at steps 402 and 412. When the VM migration is completed at step 414, the VM management center of the destination host sends notification of successful VM migration to the VM management center of the source host. Upon receiving this notification at step 404, the VM management center of the source host deprovisions the migrated VM from the source host at step 406. The VM management center of the destination host, after sending the notification at step 414, publishes to messaging system 210 the one or more MAC addresses being used by the migrated VM that are not in the inclusion group of the MAC address pool managed by the MAC allocation module on the destination side. Additional steps carried out by the VM management center of the source host, in particular by the MAC address allocation module implemented therein, are described below in conjunction with FIGS. 5 and 6.

Figure 5:
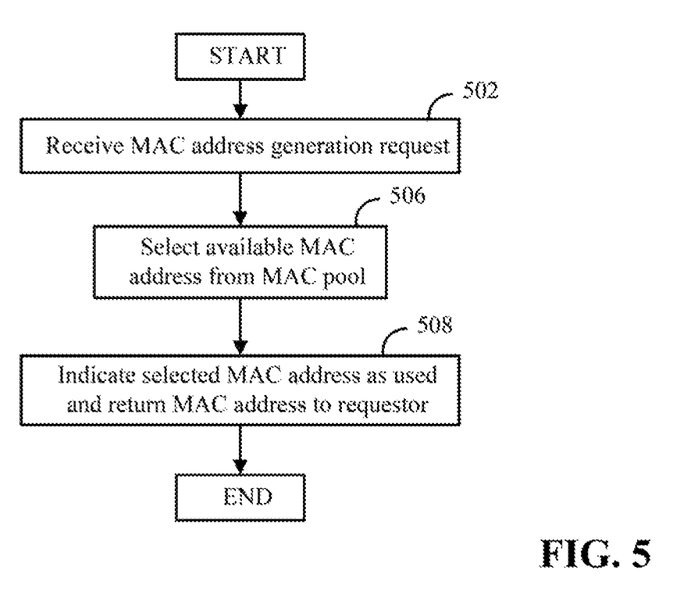
FIG. 5 is a flow diagram for generating a MAC address during VM provisioning.

FIG. 5 is a flow diagram for generating a MAC address during VM provisioning. The steps of this flow diagram are performed by a MAC address allocation module (e.g., MAC address allocation module 206 or 208), but it is contemplated that they may be performed by other suitable modules or systems.

At step 502, the MAC address allocation module receives a MAC address generation request, e.g., during provisioning of a VM. At step 506, the MAC address allocation module examines the free address bitmaps, the exclusion groups, and the OOB address list that are maintained in its MAC address pool, and selects an available MAC address (i.e., indicated as free in the free address bitmaps but not in the exclusion groups or the OOB address list) for allocation. The MAC address is selected via any technically feasible approach including the first available MAC address in the MAC address pool or a MAC address selected at random from among the group of available MAC addresses in the MAC address pool. Then, at step 508, the MAC address allocation module updates the free address bitmap corresponding to the selected MAC address by marking the bit associated with the selected MAC address as used (bit=1), and returns the selected MAC address to the requestor. The method terminates after step 508.

Periodically, the MAC address allocation module processes OOB messages posted to messaging system 210 that identify MAC addresses that are in the MAC address pool managed thereby. For example, after a VM is migrated, one or more MAC addresses being used by the migrated VM may be published to messaging system 210, or when a VM is deprovisioned, one or more MAC addresses that are being released may be published to messaging system 210. If the MAC address allocation module determines that any such MAC addresses are in the MAC address pool managed thereby, the MAC address allocation module adds them to the OOB address list in cases where they are indicated as being used and deletes them from the OOB address list in cases where they are indicated as being released.

Figure 6:
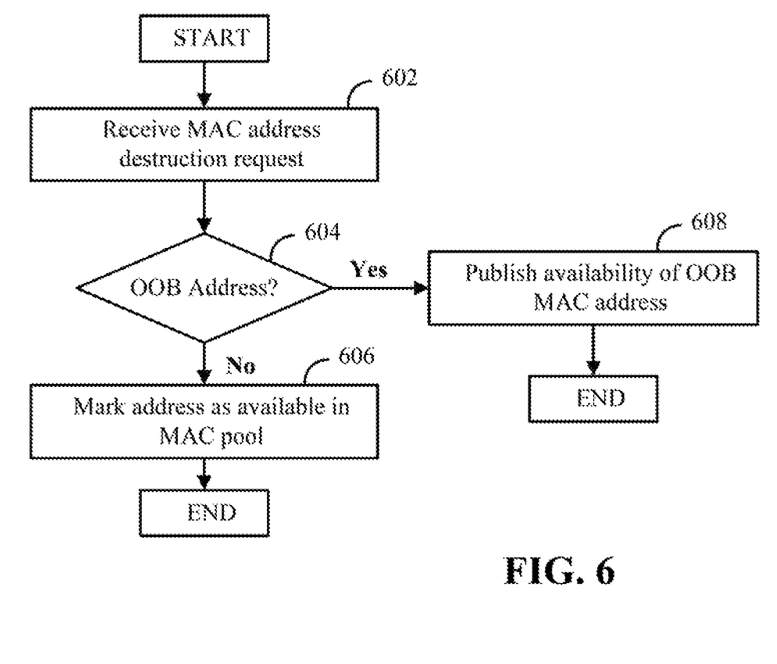
FIG. 6 is a flow diagram for releasing a MAC address during VM deprovisioning.

FIG. 6 is a flow diagram for releasing a MAC address during VM deprovisioning. The steps of this flow diagram are performed by a MAC address allocation module (e.g., MAC address allocation module 206 or 208), but it is contemplated that they may be performed by other suitable modules or systems.

At step 602, the MAC address allocation module receives a MAC address destruction request, e.g., during deprovisioning of a VM that would occur after the VM has been migrated away. At step 604, the MAC address allocation module determines whether the MAC address identified in the request is an OOB MAC address, i.e., the MAC address does not belong to the MAC address pool. If the MAC address is determined to be an OOB MAC address, the method proceeds to step 608, where the MAC address allocation module publishes a message to messaging system 210 that the OOB MAC address has been released. It should be recognized that, upon publication of this message to messaging system 210, the MAC address allocation module managing the MAC address pool that includes this OOB MAC address, will receive and process this message and remove the OOB MAC address from its corresponding OOB address list. The method terminates after step 608.

Returning to step 604, if the MAC address is determined not to be an OOB address, the method proceeds to step 606, where the MAC address allocation module updates the free address bitmap corresponding to the received MAC address by marking the bit associated with the received MAC address as free (bit=0). The method terminates after step 606.

Figure 7:
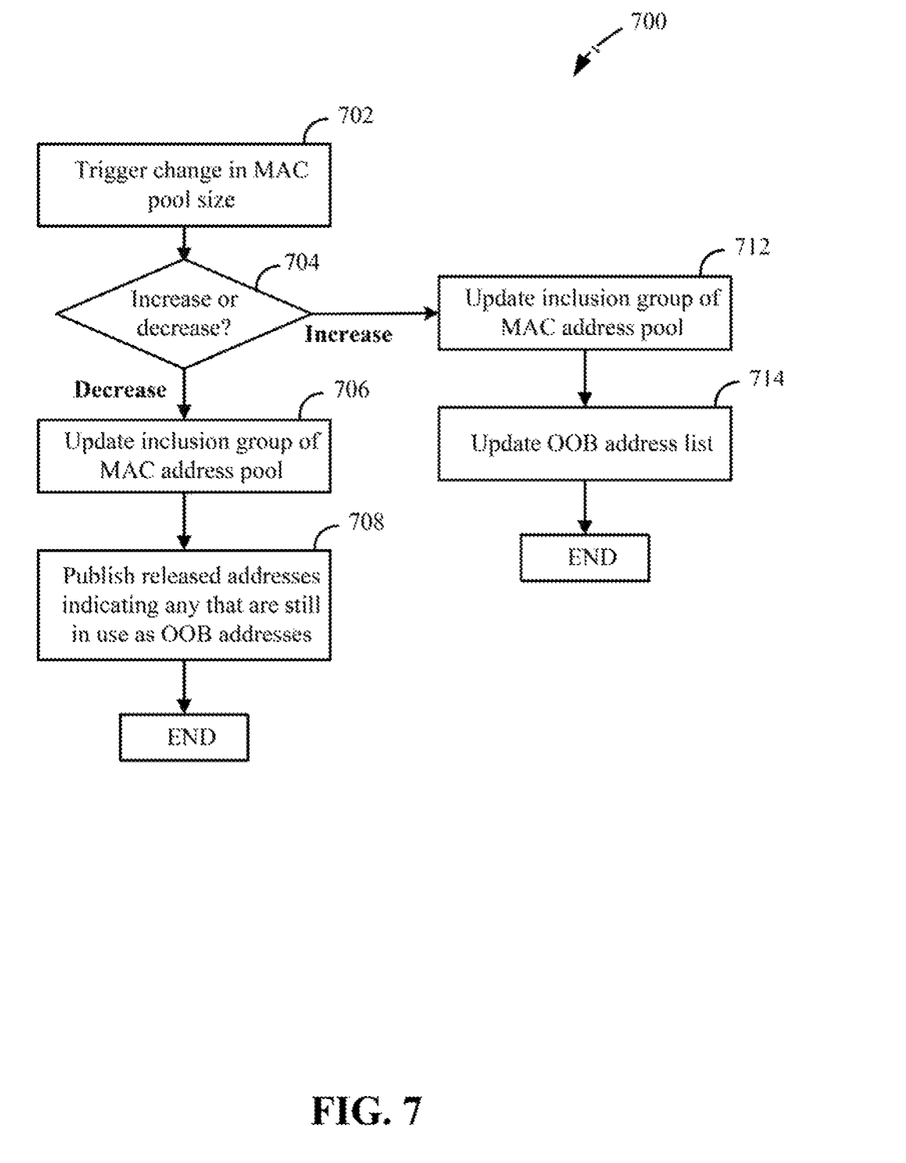
FIG. 7 is a flow diagram that illustrates a method for processing a change in MAC address pool size, according to an embodiment of the invention.

FIG. 7 is a flow diagram that illustrates a method 700 for processing a change in the size of a MAC address pool, according to an embodiment of the invention. The example operations are performed by a MAC address allocation module (e.g., MAC address allocation module 206 or 208), but it is contemplated that they may be performed by other suitable modules or systems.

At step 702, the process to change the size of a MAC address pool is triggered. The trigger may be an input from a system administrator or a programmatic trigger by the MAC address allocation module recognizing that it is running out of MAC addresses to assign or has a surplus of MAC addresses to assign. For example, a MAC address allocation module that is running out of available MAC addresses (e.g., falls below a certain threshold) may post a message requesting additional MAC addresses to messaging system 210, and a MAC address allocation module that has a surplus of available MAC addresses (e.g., greater than a certain number) may respond to the request by decreasing the size of its MAC address pool. At step 704, the MAC address allocation module determines whether the change is to decrease or increase the size of the MAC address pool. If the size of the MAC address pool is to be decreased, step 706 is executed, where the MAC address allocation module determines MAC addresses to release and updates the inclusion group of its MAC address pool, in particular the ranges defined therein, to reflect the release. It should be recognized that the MAC addresses to be released may be input by the system administrator or programmatically determined by the MAC address allocation module. At step 708, the MAC address allocation module publishes the released addresses to messaging system 210. In the case where a range of MAC addresses releases includes MAC addresses still being used, the MAC address allocation module publishes these MAC addresses as OOB addresses to messaging system. The method terminates after step 708.

If it is determined at step 704 that the size of the MAC address pool is to be increased, step 712 is executed, where the MAC address allocation module updates the inclusion group of its MAC address pool, in particular the ranges defined therein, to reflect the addition of new MAC addresses to its MAC address pool. It should be recognized that the new MAC addresses to be added may be input by the system administrator or programmatically obtained by the MAC address allocation module from messaging system 210 (if any such MAC addresses are available, e.g., as a result of another MAC address allocation module decreasing its size). At step 714, the MAC address allocation module processes OOB messages published to messaging system 210 and if it determines that any of the new MAC addresses are identified in the OOB messages, it adds them to the OOB address list of its MAC address pool. The method terminates after step 714.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of managing MAC addresses, comprising:
defining first and second MAC address pools, the first MAC address pool managed by a first virtual machine management center and defined by at least a first range of MAC addresses, and the second MAC address pool managed by a second virtual machine management center and defined by at least a second range of MAC addresses that does not overlap with the first range; and
adjusting sizes of the first and second MAC address pools in response to a request for additional MAC addresses, wherein said adjusting includes programmatically contracting the first range by the first virtual machine management center and programmatically expanding the second range by the second virtual machine management center to include MAC addresses that were in the first range prior to contraction thereof.

2. The method of claim 1, wherein the first MAC address pool is provisioned for a first virtualized computer system that includes virtual machines running in one or more host computers, and the second MAC address pool is provisioned for a second virtualized computer system that includes virtual machines running in one or more host computers.

3. The method of claim 2, further comprising:
publishing one or more MAC addresses that are within the MAC addresses that were in the first range prior to contraction thereof and are still being used within the first virtualized computer system to a messaging system.

4. The method of claim 3, further comprising:
marking the published MAC addresses as MAC addresses within the adjusted second MAC address pool that are not available for allocation.

5. The method of claim 4, further comprising:
receiving notification through the messaging system that the marked MAC addresses have been released; and
permitting allocation of the marked MAC addresses.

6. The method of claim 2, further comprising:
migrating a virtual machine from a host computer that is in the first virtualized computer system to a host computer that is in the second virtualized computer system,
wherein a MAC address for a virtual network interface controller of the virtual machine belongs in the first MAC address pool and is not changed after the virtual machine has been migrated from the host computer that is in the first virtualized computer system to the host computer that is in the second virtualized computer system.

7. The method of claim 6, further comprising:
tracking MAC addresses that belong to the first MAC address pool but are being used outside the first virtualized computer system,
wherein one of the tracked MAC addresses includes the MAC address for the virtual network interface controller of the migrated virtual machine.

8. The method of claim 1, further comprising:
tracking MAC addresses that belong to the first MAC address pool but are excluded from allocation by the first virtual machine management center; and
tracking MAC addresses that belong to the second MAC address pool but are excluded from allocation by the first virtual machine management center.

9. A non-transitory computer readable storage medium comprising instructions for causing a computer system to carry out a method of managing MAC addresses, comprising:
defining first and second MAC address pools, the first MAC address pool managed by a first virtual machine management center and defined by at least a first range of MAC addresses, and the second MAC address pool managed by a second virtual machine management center and defined by at least a second range of MAC addresses that does not overlap with the first range; and
adjusting sizes of the first and second MAC address pools in response to a request for additional MAC addresses, wherein said adjusting includes programmatically contracting the first range by the first virtual machine management center and programmatically expanding the second range by the second virtual machine management center to include MAC addresses that were in the first range prior to contraction thereof.

10. The non-transitory computer readable storage medium of claim 9, wherein the first MAC address pool is provisioned for a first virtualized computer system that includes virtual machines running in one or more host computers, and the second MAC address pool is provisioned for a second virtualized computer system that includes virtual machines running in one or more host computers.

11. The non-transitory computer readable storage medium of claim 10, wherein the method further comprises:
   publishing one or more MAC addresses that are within the MAC addresses that were in the first range prior to contraction thereof and are still being used within the first virtualized computer system to a messaging system.

12. The non-transitory computer readable storage medium of claim 11, wherein the method further comprises:
   marking the published MAC addresses as MAC addresses within the adjusted second MAC address pool that are not available for allocation.

13. The non-transitory computer readable storage medium of claim 10, wherein the method further comprises:
   migrating a virtual machine from a host computer that is in the first virtualized computer system to a host computer that is in the second virtualized computer system,
   wherein a MAC address for a virtual network interface controller of the virtual machine belongs in the first MAC address pool and is not changed after the virtual machine has been migrated from the host computer that is in the first virtualized computer system to the host computer that is in the second virtualized computer system.

14. The non-transitory computer readable storage medium of claim 13, wherein the method further comprises:
   tracking MAC addresses that belong to the first MAC address pool but are being used outside the first virtualized computer system,
   wherein one of the tracked MAC addresses includes the MAC address for the virtual network interface controller of the migrated virtual machine.

15. The non-transitory computer readable storage medium of claim 9, wherein the method further comprises:
   tracking MAC addresses that belong to the first MAC address pool but are excluded from allocation by the first virtual machine management center; and
   tracking MAC addresses that belong to the second MAC address pool but are excluded from allocation by the first virtual machine management center.

16. A virtualized computer system comprising:
   a plurality of physical host computers in which one or more virtual machines are running;
   a first virtual machine management center for managing a first group of virtual machines and a first MAC address pool;
   a second virtual machine management center for managing a second group of virtual machines and a second MAC address pool, wherein sizes of the first and second MAC address pools are adjusted in response to a request for additional MAC addresses; and
   a messaging system shared by the first and second virtual machine management centers to notify each other of allocation of MAC addresses to a virtual machine managed by one of the virtual machine management centers that belong to a MAC address pool of the other virtual machine management center.

17. The system of claim 16, wherein each virtual machine management center tracks the MAC addresses that belong to the MAC address pool thereof and the MAC addresses that belong to the MAC address pool thereof but are being used by a different virtual machine management center.

18. The system of claim 16, wherein the first MAC address pool is defined by at least a first range of MAC addresses and the second MAC address pool is defined by at least a second range of MAC addresses that does not overlap with the first range.

19. The system of claim 16, wherein the MAC addresses in the first MAC address pool do not include prefix bits to associate the MAC addresses in the first MAC address pool to the first virtual machine management center and the MAC addresses in the second MAC address pool do not include prefix bits to associate the MAC addresses in the second MAC address pool to the second virtual machine management center.

20. The method of claim 1, wherein the first virtual machine management center manages a first plurality of host computers, and the second virtual machine management center manages a second plurality of host computers.

* * * * *